United States Patent
Tzannes

(10) Patent No.: US 6,647,068 B2
(45) Date of Patent: Nov. 11, 2003

(54) VARIABLE STATE LENGTH INITIALIZATION

(75) Inventor: Marcos C Tzannes, Orinda, CA (US)

(73) Assignee: Aware, Inc., Bedford, MA (US)

( * ) Notice: Subject to any disclaimer, the term of this patent is extended or adjusted under 35 U.S.C. 154(b) by 0 days.

(21) Appl. No.: 10/163,692

(22) Filed: Jun. 7, 2002

(65) Prior Publication Data

US 2002/0186704 A1 Dec. 12, 2002

Related U.S. Application Data

(60) Provisional application No. 60/296,697, filed on Jun. 7, 2001.

(51) Int. Cl.[7] .............................. H04L 27/28; H04B 1/38
(52) U.S. Cl. ......................................... 375/260; 375/222
(58) Field of Search ................................. 375/219, 222, 375/259, 260, 261

(56) References Cited

U.S. PATENT DOCUMENTS

| | | | |
|---|---|---|---|
| 5,285,474 A | 2/1994 | Chow et al. | |
| 5,400,322 A | 3/1995 | Hunt et al. | |
| 5,479,447 A | 12/1995 | Chow et al. | |
| 5,539,777 A | 7/1996 | Grube et al. | |
| 5,606,577 A | 2/1997 | Grube et al. | |
| 5,838,667 A | 11/1998 | Bingham et al. | |
| 5,999,540 A | 12/1999 | McGhee | |
| 5,999,563 A | 12/1999 | Polley et al. | |
| 6,021,167 A | * | 2/2000 | Wu ............................. 375/354 |
| 6,064,692 A | 5/2000 | Chow | |
| 6,084,906 A | 7/2000 | Kao et al. | |
| 6,134,283 A | 10/2000 | Sands et al. | |
| 6,137,839 A | 10/2000 | Mannering et al. | |
| 6,219,378 B1 | 4/2001 | Wu | |
| 6,249,543 B1 | 6/2001 | Chow | |
| 6,278,728 B1 | 8/2001 | McHale et al. | |
| 6,279,022 B1 | 8/2001 | Miao et al. | |
| 6,285,654 B1 | 9/2001 | Marchok et al. | |
| 6,307,889 B1 | 10/2001 | Chun | |
| 6,314,102 B1 | 11/2001 | Czerwiec et al. | |
| 6,324,212 B1 | 11/2001 | Jenness | |

OTHER PUBLICATIONS

International Search Report of Oct. 16, 2002.
"Multicompany proposal for intialization", ITU–Telecommunication Standardization Sector; Temporary Document IC–094.

* cited by examiner

Primary Examiner—Stephen Chin
Assistant Examiner—David B. Lugo
(74) Attorney, Agent, or Firm—Nixon Peabody LLP; Jason H. Vick

(57) ABSTRACT

Through the use of a variable state length initialization, both the transmitter and the receiver can have control of the length of one or more initialization states. For example, a transmitter can send information, such as a message, to the receiver at the commencement of, during initialization or prior to entering a variable length initialization state. The information can specify, for example, a minimum length of an initialization state as needed by the transmitter.

90 Claims, 4 Drawing Sheets

VARIABLE STATE LENGTH INITIALIZATION

RELATED APPLICATION DATA

This application claims the benefit of and priority under 35 U.S.C. §119(e) to U.S. patent application Ser. No. 60/296,697, filed Jun. 7, 2001, entitled "Variable State Length Initialization," which is incorporated herein by reference in its entirety.

BACKGROUND OF THE INVENTION

1. Field of the Invention

The systems and methods of this invention generally related to communications systems. In particular, the systems and methods of this invention relate to providing a variable state length initialization.

2. Description of Related Art

Multicarrier modulation, which is also known as Discrete Multitone Transmission (DMT), transceivers step a through a number of initialization states prior to entering steady-state communication or "showtime." In particular, these various initialization states include channel discovery, transceiver training, channel analysis, and the like. These various initialization states allow, for example, the determination of transmitter power levels, line characteristics, training of receiver function such as equalizers or echo cancellers, or any other feature necessary to establish communication, or to exchange parameters and settings, between transceivers.

SUMMARY OF THE INVENTION

DSL (Digital Subscriber Line) modems use variable length initialization states for ADSL communications. The ITU ADSL Standards G.992.1 and G.992.2, incorporated herein by reference in their entirety, specify operation of conventional ADSL systems. For example, in "Multi-Company Proposal for Initialization," incorporated herein by reference in its entirety, the C-REVERB1 initialization state and the R-REVERB3 initialization state have a variable length. The length of a state is defined as the number of DMT symbols transmitted in that state where DMT symbols are also known as multicarrier symbols. The length of C-REVERB1 is controlled by the ATU-R (ATU-R—ADSL Transceiver Unit-Remote) and the length of R-REVERB3 is controlled by the ATU-C (ADSL Transceiver Unit—Central Office). In this example, the ATU-C transmitter continues to sends C-REVERB1 until the ATU-C receiver detects R-REVERB2 sent from the ATU-R. Likewise, the ATU-R transmitter continues to send R-REVERB3 until the ATU-R receiver detects C-REVERB2 sent from the ATU-C transmitter. For example, when the ATU-C receiver has received the R-REVERB3 signal for a sufficient amount of time, the ATU-C transmitter sends the C-REVERB2 signal to the ATU-R which once detected by the ATU-R receiver causes the ATU-R transmitter to exit the R-REVERB3 state. Likewise, when the ATU-R receiver has received the C-REVERB1 signal for a sufficient amount of time, the ATU-R transmitter sends the R-REVERB2 signal to the ATU-C which once detected by the ATU-C receiver causes the ATU-C transmitter to exit the R-REVERB3 state.

It is important for the ATU-R receiver and the ATU-C receiver to control the length of the states because the ATU-C receiver uses the R-REVERB3 signals and the ATU-R receiver uses the C-REVERB1 signals to perform adaptive signal processing algorithms such as, for example, equalizer training and frame synchronization. In general, this method of having an ATU receiver control the length of an initialization state is used in the ITU standards for ADSL G.992.2 and G.992.1.

However, at least one problem associated with this method is that it does not provide the ATU transmitter with the ability to control the length of the states. This is problematic, for example, because often the ATU transmitters may use these signals to also perform local adaptive signal processing, adaptive analog processing functions, or the like. For example, the ATU-C transmitter may use the C-REVERB1 signals to train a local, either analog or digital, echo canceller. In this example, it is important that the ATU-C maintain control of the length of the state, since the ATU-C may not have enough time to complete the echo canceller training if it is determined and regulated by the ATU-R.

Accordingly, an exemplary embodiment of this invention allows, for example, both the ATU transmitter and the ATU receiver to have control of the length of one or more initialization states. For example, an ATU transmitter can send information, such as a message, to the ATU receiver prior to entering or during a variable length initialization state. The information can specify, for example, the minimum length of the initialization state as needed by the ATU transmitter. As is done in conventional ADSL modems, the ATU receiver controls the length of the state by sending a pre-defined signal to the other ATU when the ATU receiver wishes to terminate the state.

Using the above example, based on the C-REVERB1 state, prior to entering or during the C-REVERB1 state, the ATU-C would send a message to the ATU-R indicating the minimum length of the state "MinState." For example, the ATU-C could indicate that MinState equals 1000 DMT symbols for C-REVERB1. In this case, the ATU-R would wait at least 1000 DMT symbols before the ATU-R transmitter would send R-REVERB2 to the ATU-C, and thus terminating the CREVERB1 state.

Aspects of the invention relate to multicarrier modulation communications.

Additional aspects of the invention relate to varying the lengths of initialization states in multicarrier communication system.

Additional aspects of the invention relate to ATU-C and ATU-R controlled initialization state lengths.

Aspects of the invention further relate to transmitter controlled initialization state lengths.

Aspects of the invention further relate to receiver controlled initialization state lengths Aspects of the invention additionally relate to ATU transmitter and/or receiver controlled initialization state lengths.

Aspects of the invention also relate to exchanging information between transceivers defining state lengths.

Aspects of the invention also relate to advancing to a next initialization state based at least on the completion of a variable state length initialization procedure.

These and other features and advantages of this invention are described in, or are apparent from, the following detailed description of the embodiments.

BRIEF DESCRIPTION OF THE DRAWINGS

The embodiments of the invention will be described in detailed, with reference to the following figures, wherein.

DETAILED DESCRIPTION OF THE INVENTION

Figure 1:
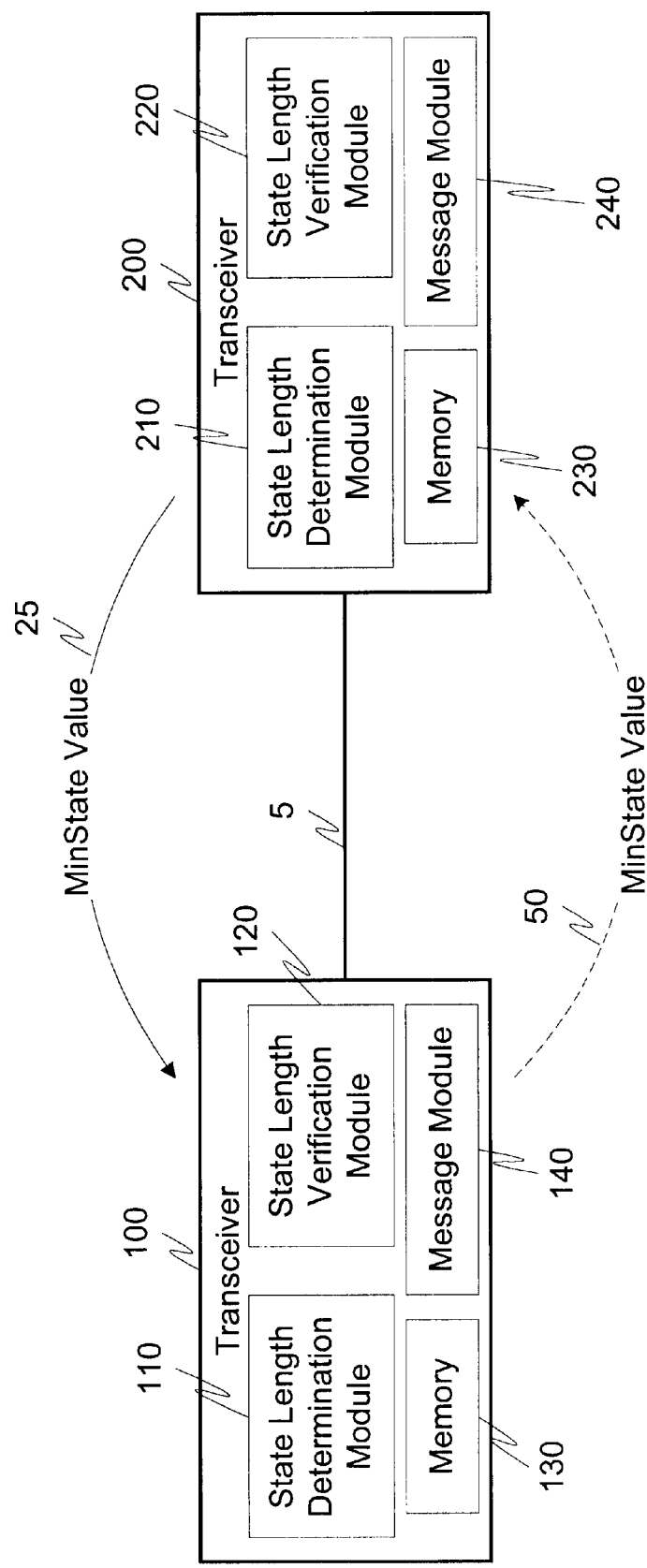
FIG. 1 is a functional block diagram illustrating an exemplary communication system according to this inventions.

FIG. 1 illustrates an exemplary communication system 10. In particular, the communication system 10 comprises a first transceiver 100 and a second transceiver 200, connected by link 5. The transceiver 100 comprises a state length determination module 110, a state length verification module 120, a memory 130 and a message module 140. The transceiver 200 comprises a state length determination module 210, a state length verification module 220, a memory 230 and a message module 240.

The exemplary systems and methods of the invention will be described in relation to a subscriber line, such as a digital subscriber line communication system. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated however that the present invention may be practiced in variety of ways beyond these specific details. For example, the systems and methods of this invention can generally be applied to any type of communications system including wireless communications systems, such as wireless LANs, for example based on the IEEE802 systems, powerline communications, or any other or combination of systems that uses mulitcarrier communications or any form of modulation that has initialization states whose lengths are controlled by the transceivers.

Furthermore, while the exemplary embodiments illustrated herein show the various components of the communication system collocated, it is to be appreciated that the various components of the system can be located at distant portions of a distributed network, such as a telecommunications network and/or the Internet, or within a dedicated variable state length initialization system. Thus, it should be appreciated that the components of the communication system can be combined into one or more devices or collocated on a particular node of a distributed network, such as a telecommunications network. As will be appreciated from the following description, and for reasons of computational efficiency, the components of the communication system can be arranged at any location within a distributed network without affecting the operation of the system.

Furthermore, it should be appreciated that the various links connecting the elements can be wired or wireless lengths, or a combination thereof, or any other know or later developed element(s) that is capable of supplying and/or communicating data to and from the connected elements. Additionally, the term module as used herein can refer to any know or later developed hardware, software or combination of hardware and software that is capable of performing the functionality associated with that element.

The communication system 10 in FIG. 1 illustrates two transceivers 100 and 200, such as an ATU-C and ATU-R. Communications between the two transceivers occurs over link 5. However, prior to steady-state communication between the two transceivers 100 and 200, an initialization must be performed.

In particular, as discussed above, initialization is used to train the transceiver which allows, for example, various parameters to be detected and identified, signal processing functions to be trained, communication details between the two transceivers established, or the like. Certain initialization states however require a certain number of DMT symbols to be sent and/or received to satisfactorily complete the training function of an initialization state.

The exemplary operational embodiments illustrated in FIG. 1 will be discussed in relation to an embodiment where the transceiver 100 is an ATU-C and the transceiver 200 is ATU-R. In the exemplary operational embodiments, the protocols and methods are used to control the length of states where the ATU-C is the transmitting transceiver and the ATU-R is the receiving transceiver. Such an example was described above in relation to the control of the length of the C-REVERB1. Furthermore, the exemplary embodiment will be discussed in relation to the transceiver 100 determining the minimum number of DMT symbols for the selected state, or, alternatively, the transceiver 200 determining the minimum number of DMT symbols for the selected state, or, alternatively, both of the transceiver 100 and the transceiver 200 determining the minimum number of DMT symbols for the selected state and monitoring the number of received or transmitted DMT symbols as discussed hereinafter.

In particular, in operation, the state length determination module 110 determines the minimum number of DMT symbols for the selected state, if any. Based on the determined MinState value, the message module 140 forwards, via communication link 5, the MinState value 50 to the transceiver 200. The transceiver 200, in cooperation with the state length verification module 220 and the memory 230, monitors the received DMT symbols from the transceiver 100. Upon the state length verification module 220 receiving at least the minimum number of specified DMT symbols, the state length verification module 220 authorizes the transceiver 200 to send a signal to the transceiver 100 such than when the signal is detected by the transmitter 100, the transceiver 100 will exit the current initialization state and transition to a new initialization state. For example, the transceiver 200 and the transceiver 100 can be preprogrammed to automatically enter a next initialization state based on the signal. Alternatively, the transceiver 200 can forward a message, via link 5, to the transceiver 100 requesting a next initialization state to be entered.

Alternatively, the transceiver 200 can specify a MinState value 25 for a particular initialization state. In particular, the state length determination module 210 determines the minimum number of DMT symbols for a selected state (MinState). Then, in cooperation with the message module 240, information identifying the MinState value is forwarded, via link 5, to the transceiver 100 and, for example, stored in memory 130. Then, in cooperation with the state length verification module 120, the transceiver 100 monitors the number of DMT symbols transmitted to the transceiver 200 associated with the current initialization state. Upon the state length verification module 120 transmitting at least the number of specified DMT symbols, the state length verification module 120 authorizes the transceiver 100 to send a signal to the transceiver 200 that when detected by the receiver of the transceiver 200 will indicate to the transceiver 200 that the current initialization state has been terminated and transition to a new initialization state is commencing.

Figure 2:
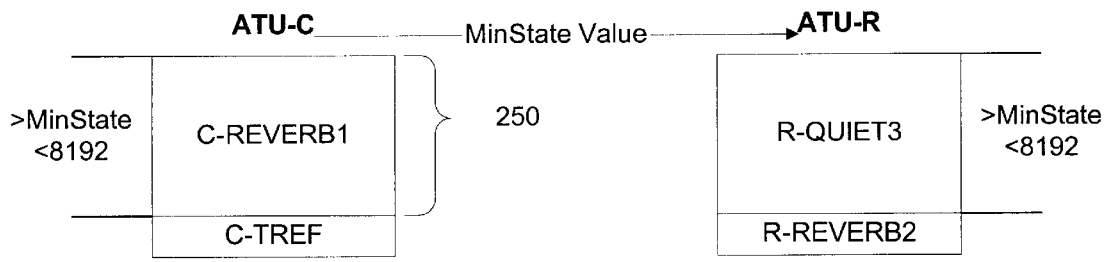
FIG. 2 is a functional block diagram illustrating exemplary communications between two modems according to this invention.

FIG. 2 illustrates the communications exchanged according to an exemplary embodiment of this invention based on the exemplary C-REVERB1 state discussed above. In particular, the ATU-C sends information, such as a message or identifier, identifying the MinState value to the ATU-R indicating the minimum length of the state. For example, the ATU-C could send information indicating that the MinState value is equal to 1000 DMT symbols for the C-REVERB1 state 250. In this exemplary case, the ATU-R would be required to, for example, wait at least 1000 DMT symbols before the ATU-R transmitter could send R-REVERB2 to the ATU-C. The forwarding of the R-REVERB2 to the ATU-C would thus terminate the CREVERB1 state.

Figure 3:
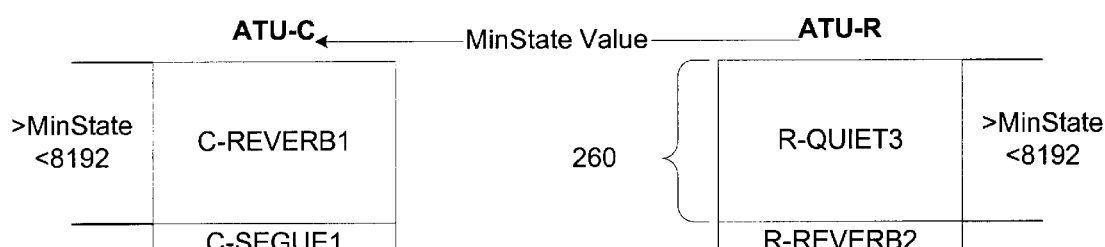
FIG. 3 is a functional block diagram illustrating exemplary communications between two modems according to a second embodiment of this invention.

Alternatively, as illustrated in FIG. 3, the ATU-R receiver may send the desired length of the state to the ATU-C transmitter and the ATU-C transmitter may terminate the state by, for example, sending a known signal, such as a signal with reverse polarity (inverted) as compared to the signal sent in the state that is being terminated, to the ATU-R receiver.

Using the C-REVERB1 state from the example above, the ATU-R would send information, such as an identifier or a message, to the ATU-C indicating the minimum length of the state 260, e.g. the MinState value. For example, the ATU-R could indicate that the MinState value equals 1000 DMT symbols for C-REVERB1. In this case, the ATU-C would be required to wait at least 1000 DMT symbols before the ATU-C transmitter could send a known signal, e.g., C-SEGUE1, to the ATU-R, and thus terminate the C-REVERB1 state.

Figure 4:
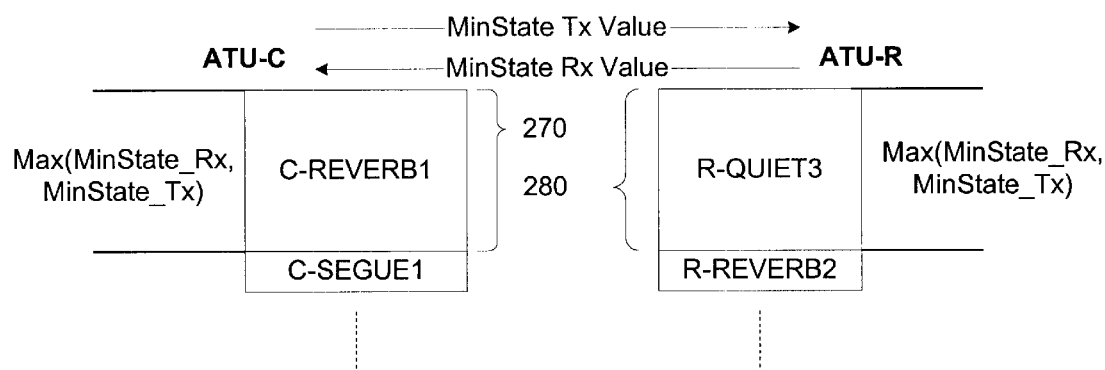
FIG. 4 is a functional block diagram illustrating exemplary communications between two modems according to a third embodiment of this invention.

Alternatively still, FIG. 4 illustrates an exemplary embodiment in which both the ATU transmitter and the ATU receiver send the desired length of the states 270 and 280 to each other. In this exemplary case, the larger number of the two MinState values is used to determine the transition out of the current state, and thus there is no need for the signal terminating the state since both transceivers know the state duration. However, it is to be appreciated, that based on the particular embodiment, it may be desirable to include a termination of state signal. As in the above embodiments, this termination signal may be sent from the ATU-R or the ATU-C.

In operation, using the C-REVERB1 state from the example above, the ATU-R would send a message to the ATU-C indicating the minimum length of the state of the receiver (MinState-Rx). For example, the ATU-R could indicate that MinState-Rx would be equal to 2000 DMT symbols for C-REVERB1. Likewise, the ATU-C could send out information, such as a message, to the ATU-R indicating the minimum length of the state of the ATU transmitter (MinState-Tx). For example, the ATU-C could indicate that MinState-Tx is equal to 1000 DMT symbols for CREVERB1. The duration of C-REVERB1 would be thus equal to the greater of the MinState-TX and MinState-Rx lengths. In this example, the length of C-REVERB1 would be chosen as the greater of the two since it was specified as being 2000 DMT symbols.

In addition, it is to be appreciated that while the above embodiments are described in relation to forwarding a single variable state length requirement from a first transceiver to a second transceiver, it is to be appreciated that it is also possible for one or more of the transceivers to specify MinState values for a plurality of states in a single communication to the other transceiver. For example, the MinState values for a plurality of states could be stored in memory and upon a determination being made to switch to a next initialization state, the transceivers would have the necessary MinState values to ensure the initialization is correctly completed for the state in question.

While the exemplary embodiments were described with the transceiver 100 being ATU-C and the trancseiver 200 being the ATU-R, these could be switched such that the transceiver 200 is the ATU-C and the transceiver 100 the ATU-R. In this alternative exemplary embodiment, the protocols and methods are used to control the length of the states where the ATU-R is the transmitting transceiver and the ATU-C is the receiving transceiver. Such an example was described above for the control of the length of the R-REVERB3.

Figure 5:
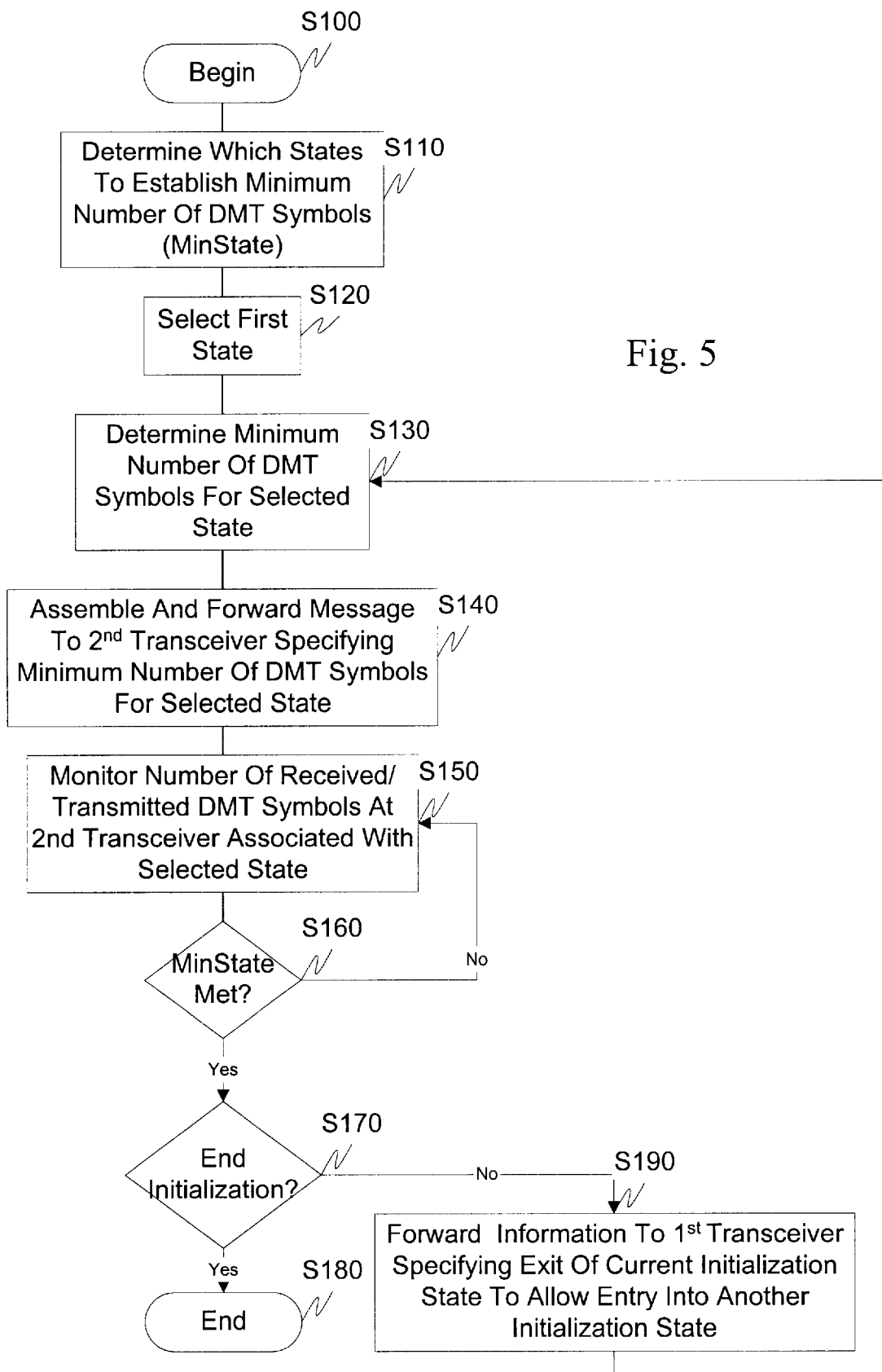
FIG. 5 is a flowchart outlining an exemplary method of performing variable state length initialization according to this invention.

FIG. 5 illustrates an exemplary embodiment for variable state length initialization according to this invention. In particular, control begins in step S100 and continues to step S110. In step S110, a determination is made as to which state(s) require a minimum number of DMT symbols. Next, in step S120, a first initialization state is selected. Then, in step S130, assuming the selected state requires a minimum number of DMT symbols, the minimum number of DMT symbols for the selected state is determined. Control then continues to step S140.

In step S140, information, such as message, specific signal or identifier, is assembled and forwarded to a second transceiver that specifies the minimum number of DMT symbols for the selected state. Next, in step S150, the number of DMT symbols received or transmitted by the second transceiver associated with the selected state is monitored. Then, in step S160, if the number of received or transmitted DMT symbols is equal to or greater than the MinState length, control continues to step S170. Otherwise, control jumps back to step S150.

In step S170, a determination is made as whether initialization is complete. If initialization is complete, control continues to step S180 where initialization ends and, for example, the transceivers enter steady-state communication. Otherwise, control jumps to step S190 where information, which can, for example, be a predefined signal, is forwarded to the first transceiver specifying the exit of the current initialization state which will allow the entry into another initialization state. Control then continues back to step S130.

Figure 6:
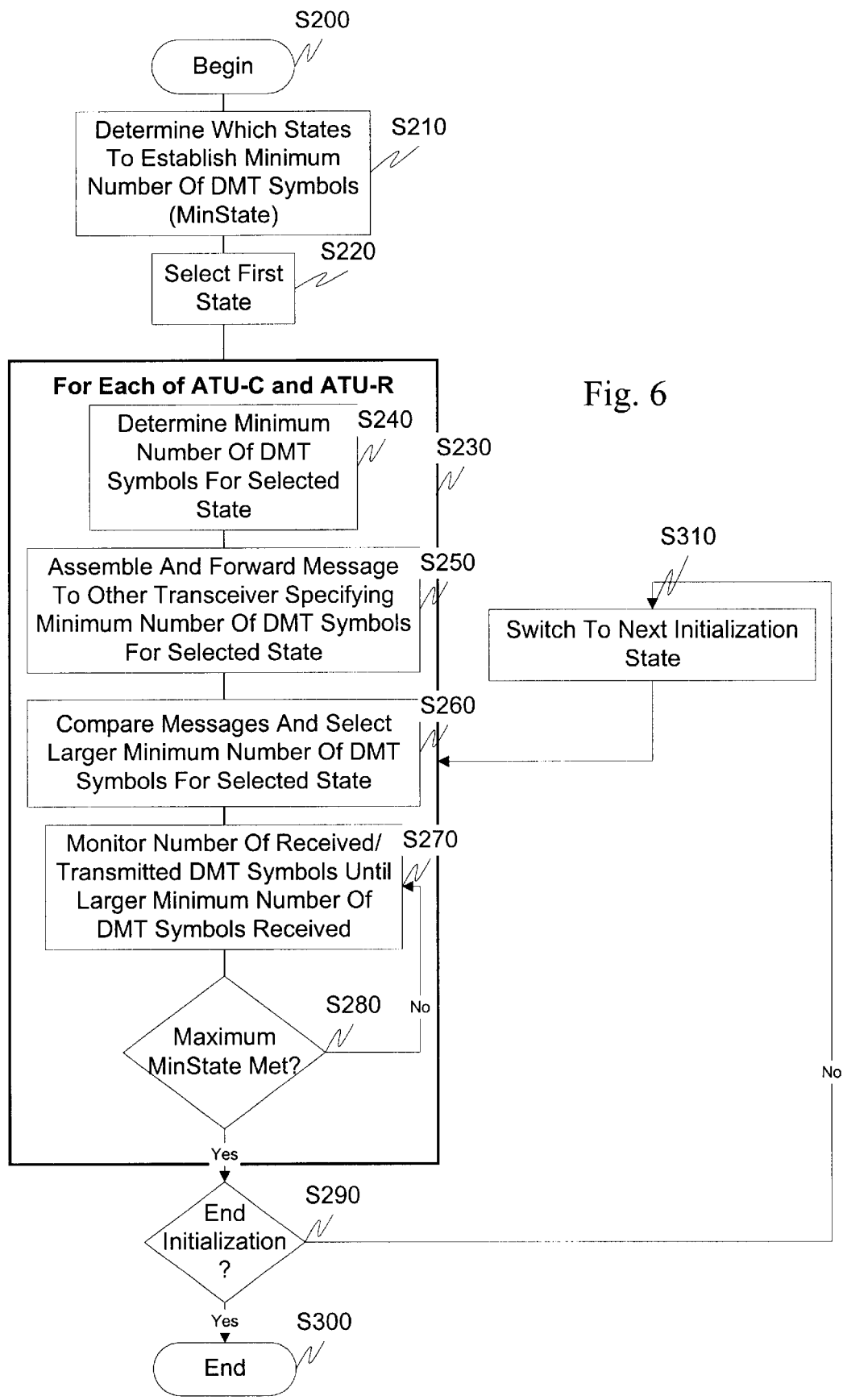
FIG. 6 is a flowchart outlining a second exemplary embodiment of performing variable state length initialization according to this invention.

FIG. 6 outlines a second exemplary embodiment where both of the ATU-C and the ATU-R specify a MinState value for a selected state. In particular, control begins in step S200 and continues to step S210. In step S210, a determination is made as to which state(s) require a minimum number of DMT symbols (MinState). Next, in step S220, a first initialization state is selected. Then, in step S230, for each of the ATU-C and ATU-R, the following steps are performed.

In particular, in step S240, the minimum number of DMT symbols for the selected state is determined. Next, in step S250, information, such as a message or identifier, is assembled and forwarded to the other transceiver specifying the minimum number of DMT symbols for the selected state. Then, in step S260, a comparison is made between the MinState value forwarded by the ATU-R and the MinState value forwarded from the ATU-C and the greater of the two MinState (MaxMinState)values selected. Control then continues to step S270.

In step S270, each of the ATU-C and ATU-R monitor the number of received or transmitted DMT symbols. Next, in step S280 a determination is made as to whether the MaxMinState value has been met. If the MaxMinState value has been met, control continues to step S290. Otherwise, control jumps back to step S270.

In step S290, a determination is made as to whether initialization is complete. If initialization is complete, control continues to step S300 where the control sequence ends. Otherwise, control jumps back to step S310 where the ATU-C and ATU-R switch to the next initialization state.

The above-described initialization protocol can be implemented on a telecommunications device, such as a modem, a DSL modem, a ADSL modem, multicarrier transceiver, or the like, or on a separate programmed general purpose computer having a communications device. However, the systems and methods of this invention can also be implemented on special purpose computer, a programmed microprocessor or microcontroller and peripheral integrated circuit elements, an ASIC, or other integrated circuit, a digital signal processor, a hard-wired electronic or logic circuit, such as discrete element circuit, a programmable logic device such as a PLD, PLA, FPGA, PAL, a modem, or the like. In general, any device capable of implementing a state machine that is in turn capable of implementing the flow charts illustrated herein can be used to implement the variable state length initialization system according to this invention.

Furthermore, the disclosed methods may be readily implemented in software using object or object-oriented software development environments that provide portable source code that can be used on a variety of computer or workstation hardware platforms. Alternatively, the disclosed variable state length initialization system may be implemented partial or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The variable state length initialization systems and methods illustrated herein however can be readily implemented in hardware and/or software using any know or later developed systems or structures, devices and/or software by those of ordinary skill in the applicable art from the functional description provided herein and with a general basic knowledge of the computer and telecommunications arts.

Moreover, the disclosed methods may be readily implemented in software executed on a programmed general purpose computer, a special purpose computer, a microprocessor, or the like. In these instances, the systems and methods of this invention can be implemented as a program embedded on a personal computer such as JAVA® or CGI script, as a resource residing on server or graphic work station, as a routine embedded in a dedicated variable state length initialization equipped receiver transceiver or the like. The variable state length initialization system can also be implemented by physically incorporating the system and method into a software and/or hardware system, such as the hardware and software systems of a variable state length initialization enabled transceiver.

It is, therefore, apparent that there has been provided, in accordance with the present invention, systems and methods for variable state length initialization. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

I claim:

1. In multicarrier communication system including a first multicarrier transceiver and a second multicarrier transceiver, a method for variable state length initialization comprising:

transmitting from the first multicarrier transceiver to the second multicarrier transceiver information identifying a value that determines a minimum number of multicarrier symbols in an initialization state;

transmitting from the first multicarrier transceiver to the second multicarrier transceiver at least the minimum number of multicarrier symbols during the initialization state; and transmitting a predefined signal from the second multicarrier transceiver to the first multicarrier transceiver allowing the first multicarrier transceiver to exit the initialization state and enter a new initialization state, wherein the predefined signal is sent from the second multicarrier transceiver to the first multicarrier transceiver after the second multicarrier transceiver receives at least the minimum number of multicarrier symbols in the initialization state.

2. The method of claim 1, wherein the minimum number of multicarrier symbols in the initialization state is less than a predefined maximum number of multicarrier symbols for the initialization state.

3. The method of claim 1, wherein the information is at least one of an identifier and a message.

4. In a multicarrier transceiver, a method for variable state length initialization comprising:

transmitting to a second multicarrier transceiver information identifying a value that determines a minimum number of multicarrier symbols in an initialization state;

transmitting to the second multicarrier transceiver at least the minimum number of multicarrier symbols during the initialization state; and receiving a predetermined signal from the second multicarrier transceiver allowing exit of the initialization state and entry into a new initialization state, wherein the predefined signal is received from the second multicarrier transceiver after at least the minimum number of multicarrier symbols have been transmitted in the initialization state.

5. The method of claim 4, wherein the minimum number of multicarrier symbols in the initialization state is less than a predefined maximum number of multicarrier symbols for the initialization state.

6. The method of claim 4, wherein the information is at least one of an identifier and a message.

7. In a multicarrier transceiver, a method for variable state length initialization comprising:

receiving from a second multicarrier transceiver information identifying a value that determines a minimum number of multicarrier symbols in an initialization state;

receiving from a second multicarrier transceiver at least the minimum number multicarrier symbols during the initialization state; and transmitting to the second multicarrier transceiver a predefined signal allowing exit of the initialization state and entry into a new initialization state, wherein the predefined signal is sent to the second multicarrier transceiver after at least the minimum number of multicarrier symbols have been received in the initialization state.

8. The method of claim 7, wherein the minimum number of multicarrier symbols in the initialization state is less than a predefined maximum number of multicarrier symbols for the initialization state.

9. The method of claim 7, wherein the information is at least one of an identifier and a message.

10. In multicarrier communication system including a first multicarrier transceiver and a second multicarrier transceiver, a method for variable state length initilization comprising:

transmitting from the first multicarrier transceiver to the second multicarrier transceiver information identifying a value that determines a minimum number of multicarrier symbols in an initialization state;

transmitting from the second multicarrier transceiver to the first multicarrier transceiver at least the minimum number of multicarrier symbols during the initialization state; and transmitting a predefined signal from the second multicarrier transceiver to the first multicarrier transceiver indicating exit from the initialization state and entry into a new initialization state, wherein the predefined signal is sent from the second multicarrier transceiver to the first multicarrier transceiver after the second multicarrier transceiver transmits at least the minimum number of multicarrier symbols in the initialization state.

11. The method of claim 10, wherein the minimum number of multicarrier symbols in the initialization state is less than a predefined maximum number of multicarrier symbols for the initialization state.

12. The method of claim 10, wherein the information is at least one of an identifier and a message.

13. In a multicarrier transceiver, a method for variable state length initialization comprising:

transmitting to a second multicarrier transceiver information identifying a value that determines a minimum number of multicarrier symbols in an initialization state;

receiving from the second multicarrier transceiver at least the minimum number of multicarrier symbols during the initialization state; and receiving a predefined signal from the second multicarrier transceiver indicating exit from the initialization state and entry into a new initialization state, wherein the predefined signal is received from the second multicarrier transceiver after at least the minimum number of multicarrier symbols have been transmitted in the initialization state.

14. The method of claim 13, wherein the minimum number of multicarrier symbols in the initialization state is less than a predefined maximum number of multicarrier symbols for the initialization state.

15. The method of claim 13, wherein the information is at least one of an identifier and a message.

16. In a multicarrier transceiver, a method for variable state length initialization comprising:

receiving from a second multicarrier transceiver information identifying a value that determines a minimum number of multicarrier symbols in an initialization state;

transmitting from a second multicarrier transceiver at least the minimum number multicarrier symbols during the initialization state; and transmitting to the second multicarrier transceiver a predefined signal indicating exit from the initialization state and entry into a new initialization state, wherein the predefined signal is sent to the second multicarrier transceiver after at least the minimum number of multicarrier symbols have been received in the initialization state.

17. The method of claim 16, wherein the minimum number of multicarrier symbols in the initialization state is less than a predefined maximum number of multicarrier symbols for the initialization state.

18. The method of claim 16, wherein the information is at least one of an identifier and a message.

19. A variable state length initialization multicarrier communication system including a first multicarrier transceiver and a second multicarrier transceiver comprising:

means for transmitting from the first multicarrier transceiver to the second multicarrier transceiver information identifying a value that determines a minimum number of multicarrier symbols in an initialization state;

means for transmitting from the first multicarrier transceiver to the second multicarrier transceiver at least the minimum number of multicarrier symbols during the initialization state; and means for transmitting a predefined signal from the second multicarrier transceiver to the first multicarrier transceiver allowing the first multicarrier transceiver to exit the initialization state and enter a new initialization state, wherein the predefined signal is sent from the second multicarrier transceiver to the first multicarrier transceiver after the second multicarrier transceiver receives at least the minimum number of multicarrier symbols in the initialization state.

20. The system of claim 19, wherein the minimum number of multicarrier symbols in the initialization state is less than a predefined maximum number of multicarrier symbols for the initialization state.

21. The system of claim 19, wherein the information is at least one of an identifier and a message.

22. A variable state length initialization multicarrier transceiver comprising:

means for transmitting to a second multicarrier transceiver information identifying a value that determines a minimum number of multicarrier symbols in an initialization state;

means for transmitting to the second multicarrier transceiver at least the minimum number of multicarrier symbols during the initialization state; and means for receiving a predetermined signal from the second multicarrier transceiver allowing exit of the initialization state and entry into a new initialization state, wherein the predefined signal is received from the second multicarrier transceiver after at least the minimum number of multicarrier symbols have been transmitted in the initialization state.

23. The system of claim 22, wherein the minimum number of multicarrier symbols in the initialization state is less than a predefined maximum number of multicarrier symbols for the initialization state.

24. The system of claim 22, wherein the information is at least one of an identifier and a message.

25. A variable state length initialization multicarrier transceiver comprising:

means for receiving from a second multicarrier transceiver information identifying a value that determines a minimum number of multicarrier symbols in an initialization state;

means for receiving from a second multicarrier transceiver at least the minimum number multicarrier symbols during the initialization state; and means for transmitting to the second multicarrier transceiver a predefined signal allowing exit of the initialization state and entry into a new initialization state, wherein the predefined signal is sent to the second multicarrier transceiver after at least the minimum number of multicarrier symbols have been received in the initialization state.

26. The system of claim 25, wherein the minimum number of multicarrier symbols in the initialization state is less than a predefined maximum number of multicarrier symbols for the initialization state.

27. The system of claim 25, wherein the information is at least one of an identifier and a message.

28. A variable state length initialization multicarrier communication system including a first multicarrier transceiver and a second multicarrier transceiver comprising:

means for transmitting from the first multicarrier transceiver to the second multicarrier transceiver information identifying a value that determines a minimum number of multicarrier symbols in an initialization state;

means for transmitting from the second multicarrier transceiver to the first multicarrier transceiver at least the minimum number of multicarrier symbols during the initialization state; and means for transmitting a predefined signal from the second multicarrier transceiver to the first multicarrier transceiver indicating exit from the initialization state and entry into a new initialization state, wherein the predefined signal is sent the second multicarrier transceiver to the first multicarrier transceiver after the second multicarrier transceiver transmits at least the minimum number of multi carrier symbols in the initialization state.

29. The system of claim 28, wherein the minimum number of multicarrier symbols in the initialization state is less than a predefined maximum number of multicarrier symbols for the initialization state.

30. The system of claim 28, wherein the information is at least one of an identifier and a message.

31. A variable state length initialization multicarrier transceiver comprising:

means for transmitting to a second multicarrier transceiver information identifying a value that determines a minimum number of multicarrier symbols in an initialization state;

means for receiving from the second multicarrier transceiver at least the minimum number of multicarner symbols during the initialization state; and means for receiving a predefined signal from the second multicarrier transceiver indicating exit from the initialization state and entry into a new initialization state, wherein the predefined signal is received from the second multicarrier transceiver after at least the minimum number of multicarrier symbols have been transmitted in the initialization state.

32. The system of claim 31, wherein the minimum number of multicarrier symbols in the initialization state is less than a predefined maximum number of multicarrier symbols for the initialization state.

33. The system of claim 31, wherein the information is at least one of an identifier and a message.

34. A variable state length initialization multicarrier transceiver comprising:

means for receiving from a second multicarrier transceiver information identifying a value that determines a minimum number of multicarrier symbols in an initialization state;

means for transmitting to a second multicarrier transceiver at least the minimum number multicarrier symbols during the initialization state; and means for transmitting to the second multicarrier transceiver a predefined signal indicating exit from the initialization state and entry into a new initialization state, wherein the predefined signal is sent to the second multicarrier transceiver after at least the minimum number of multicarrier symbols have been received in the initialization state.

35. The system of claim 34, wherein the minimum number of multicarrier symbols in the initialization state is less than a predefined maximum number of multicarrier symbols for the initialization state.

36. The system of claim 34, wherein the information is at least one of an identifier and a message.

37. A variable state length initialization multicarrier communication system comprising:

a first multicarrier transceiver that transmits information identifying a value that determines a minimum number of multicarrier symbols in an initialization state and that transmits at least the minimum number of multicarrier symbols during the initialization state; and a second multicarrier transceiver that transmits a predefined signal to the first multicarrier transceiver allowing the first multicarrier transceiver to exit the initialization state and enter a new initialization state, wherein the predefined signal is sent from the second multicarrier transceiver to the first multicarrier transceiver after the second multicarrier transceiver receives at least the minimum number of multicarrier symbols in the initialization state.

38. The system of claim 37, wherein the minimum number of multicarrier symbols in the initialization state is less than a predefined maximum number of multicarrier symbols for the initialization state.

39. The system of claim 37, wherein the information is at least one of an identifier and a message.

40. A variable state length initialization multicarrier communication system comprising:

a first transceiver that transmits information identifying a value that determines a minimum number of multicarrier symbols in an initialization state and at least the minimum number of multicarrier symbols during the initialization state; and a predetermined signal that is received from a second multicarrier transceiver that allows the exit of the initialization state and entry into a new initialization state, wherein the predefined signal is received from the second multicarrier transceiver after at least the minimum number of multicarrier symbols have been transmitted in the initialization state.

41. The system of claim 40, wherein the minimum number of multicarrier symbols in the initialization state is less than a predefined maximum number of multicarrier symbols for the initialization state.

42. The system of claim 40, wherein the information is at least one of an identifier and a message.

43. A variable state length initialization multicarrier transceiver comprising:
   a receiver portion that receives from a second multicarrier transceiver information identifying a value that determines a minimum number of multicarrier symbols in an initialization state and at least the minimum number multicarrier symbols during the initialization state; and
   a transmitter portion that transmits to the second multicarrier transceiver a predefined signal allowing exit of the initialization state and entry into a new initialization state, wherein the predefined signal is sent to the second multicarrier transceiver after at least the minimum number of multicarrier symbols have been received in the initialization state.

44. The system of claim 43, wherein the minimum number of multicarrier symbols in the initialization state is less than a predefined maximum number of multicarrier symbols for the initialization state.

45. The system of claim 43, wherein the information is at least one of an identifier and a message.

46. A variable state length initialization multicarrier communication system including a first multicarrier transceiver and a second multicarrier transceiver comprising:
   a transmitter portion that transmits from the first multicarrier transceiver to the second multicarrier transceiver information identifying a value that determines a minimum number of multicarrier symbols in an initialization state and at least the minimum number of multicarrier symbols during the initialization state; and
   a second transmitter portion that transmits a predefined signal from the second multicarrier transceiver to the first multicarrier transceiver indicating exit from the initialization state and entry into a new initialization state, wherein the predefined signal is sent from the second multicarrier transceiver to the first multicarrier transceiver after the second multicarrier transceiver transmits at least the minimum number of multicarrier symbols in the initialization state.

47. The system of claim 46, wherein the minimum number of multicarrier symbols in the initialization state is less than a predefined maximum number of multicarrier symbols for the initialization state.

48. The system of claim 46, wherein the information is at least one of an identifier and a message.

49. A variable state length initialization multicarrier transceiver comprising:
   a transmitter portion that transmits to a second multicarrier transceiver information identifying a value that determines a minimum number of multicarrier symbols in an initialization state;
   a receiver portion that receives from the second multicarrier transceiver at least the minimum number of multicarrier symbols during the initialization state and a predefined signal indicating exit from the initialization state and entry into a new initialization state, wherein the predefined signal is received from the second multicarrier transceiver after at least the minimum number of multicarrier symbols have been transmitted in the initialization state.

50. The system of claim 49, wherein the minimum number of multicarrier symbols in the initialization state is less than a predefined maximum number of multicarrier symbols for the initialization state.

51. The system of claim 49, wherein the information is at least one of an identifier and a message.

52. A variable state length initialization multicarrier transceiver comprising:
   a receiver portion that receives from a second multicarrier transceiver information identifying a value that determines a minimum number of multicarrier symbols in an initialization state;
   a transmitter portion that transmits to a second multicarrier transceiver at least the minimum number multicarrier symbols during the initialization state and a predefined signal indicating exit from the initialization state and entry into a new initialization state, wherein the predefined signal is sent to the second multicarrier transceiver after at least the minimum number of multicarrier symbols have been received in the initialization state.

53. The system of claim 52, wherein the minimum number of multicarrier symbols in the initialization state is less than a predefined maximum number of multicarrier symbols for the initialization state.

54. The system of claim 52, wherein the information is at least one of an identifier and a message.

55. An information storage media comprising information for variable state length initialization in a multicarrier communication system including a first multicarrier transceiver and a second multicarrier transceiver comprising:
   information that transmits from the first multicarrier transceiver to the second multicarrier transceiver information identifying a value that determines a minimum number of multicarrier symbols in an initialization state;
   information that transmits from the first multicarrier transceiver to the second multicarrier transceiver at least the minimum number of multicarrier symbols during the initialization state; and
   information that transmits a predefined signal from the second multicarrier transceiver to the first multicarrier transceiver allowing the first multicarrier transceiver to exit the initialization state and enter a new initialization state, wherein the predefined signal is sent from the second multicarrier transceiver to the first multicarrier transceiver after the second multicarrier transceiver receives at least the minimum number of multicarrier symbols in the initialization state.

56. The media of claim 55, wherein the minimum number of multicarrier symbols in the initialization state is less than a predefined maximum number of multicarrier symbols for the initialization state.

57. The media of claim 55, wherein the information is at least one of an identifier and a message.

58. An information storage media comprising information for variable state length initialization in a multicarrier transceiver comprising:
   information that transmits to a second multicarrier transceiver information identifying a value that determines a minimum number of multicarrier symbols in an initialization state;
   information that transmits to the second multicarrier transceiver at least the minimum number of multicarrier symbols during the initialization state; and
   information that receives a predetermined signal from the second multicarrier transceiver allowing exit of the initialization state and entry into a new initialization state, wherein the predefined signal is received from the second multicarrier transceiver after at least the minimum number of multicarrier symbols have been transmitted in the initialization state.

59. The media of claim 58, wherein the minimum number of multicarrier symbols in the initialization state is less than a predefined maximum number of multicarrier symbols for the initialization state.

60. The media of claim 58, wherein the information is at least one of an identifier and a message.

61. An information storage media comprising information for variable state length initialization in a multicarrier transceiver comprising:
    information that receives from a second multicarrier transceiver information identifying a value that determines a minimum number of multicarrier symbols in an initialization state;
    information that receives from a second multicarrier transceiver at least the minimum number multicarrier symbols during the initialization state; and
    information that transmits to the second multicarrier transceiver a predefined signal allowing exit of the initialization state and entry into a new initialization state, wherein the predefined signal is sent to the second multicarrier transceiver after at least the minimum number of multicarrier symbols have been received in the initialization state.

62. The media of claim 61, wherein the minimum number of multicarrier symbols in the initialization state is less than a predefined maximum number of multicarrier symbols for the initialization state.

63. The media of claim 61, wherein the information is at least one of an identifier and a message.

64. An information storage media comprising information for variable state length initialization in a multicarrier communication system including a first multicarrier transceiver and a second multicarrier transceiver comprising:
    information that transmits from the first multicarrier transceiver to the second multicarrier transceiver information identifying a value that determines a minimum number of multicarrier symbols in an initialization state;
    information that transmits from the second multicarrier transceiver to the first multicarrier transceiver at least the minimum number of multicarrier symbols during the initialization state; and
    information that transmits a predefined signal from the second multicarrier transceiver to the first multicarrier transceiver indicating exit from the initialization state and entry into a new initialization state, wherein the predefined signal is sent from the second multicarrier transceiver to the first multicarrier transceiver after the second multicarrier transceiver transmits at least the minimum number of multicarrier symbols in the initialization state.

65. The media of claim 64, wherein the minimum number of multicarrier symbols in the initialization state is less than a predefined maximum number of multicarrier symbols for the initialization state.

66. The media of claim 64, wherein the information is at least one of an identifier and a message.

67. An information storage media comprising information for variable state length initialization in a multicarrier transceiver comprising:
    information that transmits to a second multcarrier transceiver information identifying a value that determines a minimum number of multicarrier symbols in an initialization state;
    information that receives from the second multicarrier transceiver at least the minimum number of multicarrier symbols during the initialization state; and
    information that receives a predefined signal from the second multicarrier transceiver indicating exit from the initialization state and entry into a new initialization state, wherein the predefined signal is received from the second multicarrier transceiver after at least the minimum number of multicarrier symbols have been transmitted in the initialization state.

68. The media of claim 67, wherein the minimum number of multicarrier symbols in the initialization state is less than a predefined maximum number of multicarrier symbols for the initialization state.

69. The media of claim 67, wherein the information is at least one of an identifier and a message.

70. An information storage media comprising information for variable state length initialization in a multicarrier transceiver comprising:
    information that receives from a second multicarrier transceiver information identifying a value that determines a minimum number of multicarrier symbols in an initialization state;
    information that transmits to a second multicarrier transceiver at least the minimum number multicarrier symbols during the initialization state; and
    information that transmits to the second multicarrier transceiver a predefined signal indicating exit from the initialization state and entry into a new initialization state, wherein the predefined signal is sent to the second multicarrier transceiver after at least the minimum number of multicarrier symbols have been received in the initialization state.

71. The media of claim 70, wherein the minimum number of multicarrier symbols in the initialization state is less than a predefined maximum number of multicarrier symbols for the initialization state.

72. The media of claim 70, wherein the information is at least one of an identifier and a message.

73. A communication protocol for variable state length initialization in a multicarrier communication system including a first multicarrier transceiver and a second multicarrier transceiver comprising:
    transmitting from the first multicarrier transceiver to the second multicarrier transceiver information identifying a value that determines a minimum number of multicarrier symbols in an initialization state;
    transmitting from the first multicarrier transceiver to the second multicarrier transceiver at least the minimum number of multicarrier symbols during the initialization state; and
    transmitting a predefined signal from the second multicarrier transceiver to the first multicarrier transceiver allowing the first multicarrier transceiver to exit the initialization state and enter a new initialization state, wherein the predefined signal is sent from the second multicarrier transceiver to the first multicarrier transceiver after the second multicarrier transceiver receives at least the minimum number of multicarrier symbols in the initialization state.

74. The protocol of claim 73, wherein the minimum number of multicarrier symbols in the initialization state is less than a predefined maximum number of multicarrier symbols for the initialization state.

75. The protocol of claim 73, wherein the information is at least one of an identifier and a message.

76. A communication protocol for variable state length initialization in a multicarrier transceiver comprising:
    transmitting to a second multicarrier transceiver information identifying a value that determines a minimum number of multicarrier symbols in an initialization state;

transmitting to the second multicarrier transceiver at least the minimum number of multicarrier symbols during the initialization state; and receiving a predetermined signal from the second multicarrier transceiver allowing exit of the initialization state and entry into a new initialization state, wherein the predefined signal is received from the second multicarrier transceiver after at least the minimum number of multicarrier symbols have been transmitted in the initialization state.

77. The protocol of claim 76, wherein the minimum number of multicarrier symbols in the initialization state is less than a predefined maximum number of multicarrier symbols for the initialization state.

78. The protocol of claim 76, wherein the information is at least one of an identifier and a message.

79. A communications protocol for variable state length initialization in a multicarrier transceiver comprising:

receiving from a second multicarrier transceiver information identifying a value that determines a minimum number of multicarrier symbols in an initialization state;

receiving from a second multicarrier transceiver at least the minimum number multicarrier symbols during the initialization state; and transmitting to the second multicarrier transceiver a predefined signal allowing exit of the initialization state and entry into a new initialization state, wherein the predefined signal is sent to the second multicarrier transceiver after at least the minimum number of multicarrier symbols have been received in the initialization state.

80. The protocol of claim 79, wherein the minimum number of multicarrier symbols in the initialization state is less than a predefined maximum number of multicarrier symbols for the initialization state.

81. The protocol of claim 79, wherein the information is at least one of an identifier and a message.

82. A communications protocol for variable state length initialization in a multicarrier communication system including a first multicarrier transceiver and a second multicarrier transceiver comprising:

transmitting from the first multicarrier transceiver to the second multicarrier transceiver information identifying a value that determines a minimum number of multicarrier symbols in an initialization state;

transmitting from the second multicarrier transceiver to the first multicarrier transceiver at least the minimum number of multicarrier symbols during the initialization state; and transmitting a predefined signal from the second multicarrier transceiver to the first multicarrier transceiver indicating exit from the initialization state and entry into a new initialization state, wherein the predefined signal is sent from the second multicarrier transceiver to the first multicarrier transceiver after the second multicarrier transceiver transmits at least the minimum number of multicarrier symbols in the initialization state.

83. The protocol of claim 82, wherein the minimum number of multicarrier symbols in the initialization state is less than a predefined maximum number of multicarrier symbols for the initialization state.

84. The protocol of claim 82, wherein the information is at least one of an identifier and a message.

85. A communications protocol for variable state length initialization in a multicarrier transceiver comprising:

transmitting to a second multicarrier transceiver information identifying a value that determines a minimum number of multicarrier symbols in an initialization state;

receiving from the second multicarrier transceiver at least the minimum number of multicarrier symbols during the initialization state; and receiving a predefined signal from the second multicarrier transceiver indicating exit from the initialization state and entry into a new initialization state, wherein the predefined signal is received from the second multicarrier transceiver after at least the minimum number of multicarrier symbols have been transmitted in the initialization state.

86. The protocol of claim 85, wherein the minimum number of multicarrier symbols in the initialization state is less than a predefined maximum number of multicarrier symbols for the initialization state.

87. The protocol of claim 85, wherein the information is at least one of an identifier and a message.

88. A communications protocol for variable state length initialization in a multicarrier transceiver comprising:

receiving from a second multicarrier transceiver information identifying a value that determines a minimum number of multicarrier symbols in an initialization state;

transmitting from a second multicarrier transceiver at least the minimum number multicarrier symbols during the initialization state; and transmitting to the second multicarrier transceiver a predefined signal indicating exit from the initialization state and entry into a new initialization state, wherein the predefined signal is sent to the second multicarrier transceiver after at least the minimum number of multicarrier symbols have been received in the initialization state.

89. The protocol of claim 88, wherein the minimum number of multicarrier symbols in the initialization state is less than a predefined maximum number of multicarrier symbols for the initialization state.

90. The protocol of claim 88, wherein the information is at least one of an identifier and a message.

* * * * *

UNITED STATES PATENT AND TRADEMARK OFFICE
CERTIFICATE OF CORRECTION

PATENT NO. : 6,647,068 B2
DATED : November 11, 2003
INVENTOR(S) : Marcos C. Tzannes It is certified that error appears in the above-identified patent and that said Letters Patent is hereby corrected as shown below:

Column 8,
Line 1, "In multicarrier" should read -- In a multicarrier --.

Column 10,
Line 1, "transmitting from a" should read -- transmitting to the --.

Column 16,
Line 19, "transmits to a" should read -- transmits to the --.

Column 18,
Line 39, "transmitting from a" should read -- transmitting to the --.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,647,068 B2 | Page 1 of 1 |
| APPLICATION NO. | : 10/163692 | |
| DATED | : November 11, 2003 | |
| INVENTOR(S) | : Tzannes | |

It is certified that error appears in the above-identified patent and that said Letters Patent is hereby corrected as shown below:

Col 13, claim 46, beginning on line 8, please delete the phrase "and at least the minimum number of multicarrier symbols during the initialization state" therein.

Signed and Sealed this

Twelfth Day of June, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,647,068 B2 | |
| APPLICATION NO. | : 10/163692 | |
| DATED | : November 11, 2003 | |
| INVENTOR(S) | : Marcos C. Tzannes | |

It is certified that error appears in the above-identified patent and that said Letters Patent is hereby corrected as shown below:

Column 8, Claim 7
Line 65, please replace "a second multicarrier transceiver" with --the second multicarrier transceiver--.

Column 8, Claim 7
Line 66, please replace "the minimum, number multicarrier symbols" with --the minimum number of multicarrier symbols--.

Column 9, Claim 10
Line 13, please replace "In multicarrier" with --In a multicarrier--.

Column 10, Claim 16
Line 2, please replace "the minimum number multicarrier symbols" with --the minimum number of multicarrier symbols--.

Column 11, Claim 25
Line 5, please replace "a second multicarrier transceiver" with --the second multicarrier transceiver--.

Column 11, Claim 25
Line 6, please replace "the minimum number multicarrier symbols" with --the minimum number of multicarrier symbols--.

Column 11, Claim 28
Line 37, please replace "signal is sent the" with --signal is sent from the--.

Column 12, Claim 34
Line 9, please replace "a second multicarrier transceiver" with --the second multicarrier transceiver--.

Signed and Sealed this
Seventeenth Day of May, 2011

David J. Kappos
*Director of the United States Patent and Trademark Office*

Column 12, Claim 34
Lines 10 and 11, please replace "the minimum number multicarrier symbols" with
--the minimum number of multicarrier symbols--.

Column 13, Claim 43
Lines 6 and 7, please replace "the minimum number multicarrier symbols" with --the
minimum number of multicarrier symbols--.

Column 14, Claim 52
Lines 5 and 6, please replace "a second multicarrier transceiver" with --the second
multicarrier transceiver--.

Column 14, Claim 52
Lines 6 and 7, please replace "the minimum number multicarrier symbols" with --the
minimum number of multicarrier symbols--.

Column 15, Claim 61
Lines 12 and 13, please replace "a second multicarrier transceiver" with --the second
multicarrier transceiver--.

Column 15, Claim 61
Lines 13 and 14, please replace "the minimum number multicarrier symbols" with
--the minimum number of multicarrier symbols--.

Column 16, Claim 70
Lines 20 and 21, please replace "the minimum number multicarrier symbols" with
--the minimum number of multicarrier symbols--.

Column 17, Claim 76
Line 4, please replace "a predetermined" with --a predefined--.

Column 17, Claim 79
Line 23, please replace "a second multicarrier transceiver" with --the second
multicarrier transceiver--.

Column 17, Claim 79
Line 24, please replace "the minimum number multicarrier symbols" with --the
minimum number of multicarrier symbols--.

Column 18, Claim 88
Line 40, please replace "the minimum number multicarrier symbols" with --the
minimum number of multicarrier symbols--.

UNITED STATES PATENT AND TRADEMARK OFFICE
CERTIFICATE OF CORRECTION

| | |
|---|---|
| PATENT NO. | : 6,647,068 B2 |
| APPLICATION NO. | : 10/163692 |
| DATED | : November 11, 2003 |
| INVENTOR(S) | : Marcos C. Tzannes |

It is certified that error appears in the above-identified patent and that said Letters Patent is hereby corrected as shown below:

Column 8, Claim 4
Line 46, please replace "a predetermined" with --a predefined--.

Column 10, Claim 22
Line 53, please replace "a predetermined" with --a predefined--.

Column 12, Claim 40
Line 55, please replace "a predetermined" with --a predefined--.

Column 14, Claim 58
Line 59, please replace "a predetermined" with --a predefined--.

Signed and Sealed this
Twenty-sixth Day of June, 2012

David J. Kappos
*Director of the United States Patent and Trademark Office*